Figure 1:
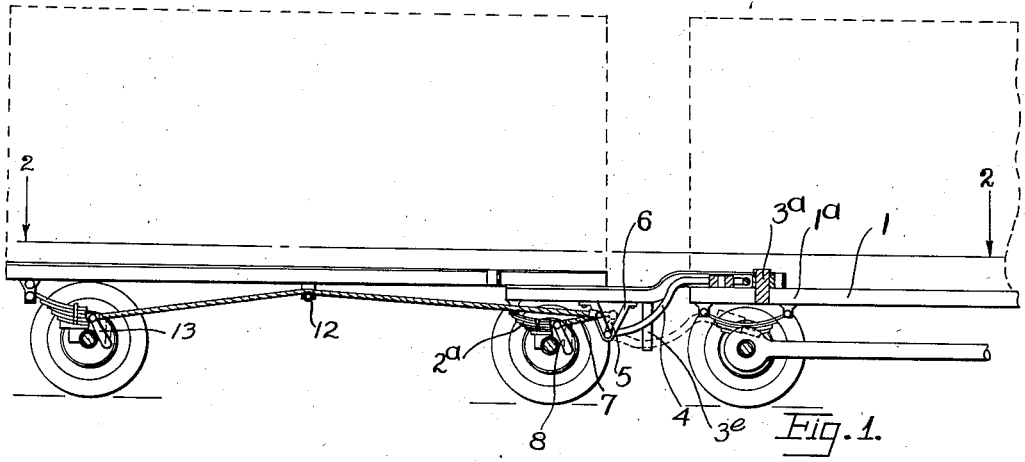

March 5, 1940.　　L. G. NIELSEN ET AL　　2,192,384

AUTOMATIC BRAKE CONTROL APPARATUS FOR TRAILERS

Filed May 4, 1938

INVENTORS
Leo Gunnar Nielsen,
Ferreol C. Lymburner and
Ferreol A. Lymburner
BY A. B. Bowman
ATTORNEY.

Patented Mar. 5, 1940

2,192,384

UNITED STATES PATENT OFFICE 2,192,384

AUTOMATIC BRAKE CONTROL APPARATUS FOR TRAILERS

Leo Gunnar Nielsen, Ferreol C. Lymburner, and Ferreol A. Lymburner, San Diego, Calif.

Application May 4, 1938, Serial No. 206,020

3 Claims. (Cl. 188—3)

Our invention relates to an automatic brake control apparatus for trailers and the objects of our invention are:

First, to provide an apparatus to be used in connection with the conventional trailer hitch for applying brakes on the trailer in case the conventional trailer hitch becomes disconnected from the propulsion vehicle;

Second, to provide an apparatus of this class which automatically applies the brakes to the trailer regardless of the position or grade of the trailer when it is disconnected from the propulsion vehicle;

Third, to provide an apparatus of this class which may be applied to the conventional trailer hitches now in use;

Fourth, to provide an apparatus of this class which is applicable for either two or four wheel trailers;

Fifth, to provide an apparatus of this class which may be readily attached to the conventional trailer and trailer hitch;

Sixth, to provide an apparatus of this class which provides a safe and substantial brake for trailers when disconnected from the propulsion vehicle; and Seventh, to provide an apparatus of this class which is very simple and economical of construction, easy to apply, efficient in its action, and which will not readily deteriorate or get out of order.

Figure 2:
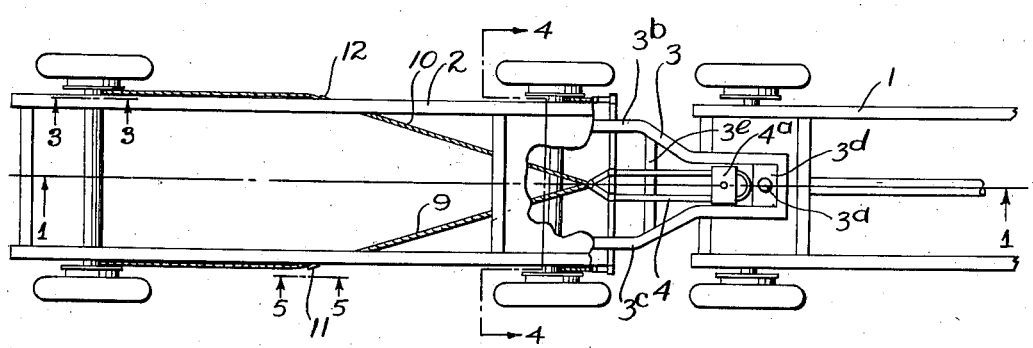
Figure 3:
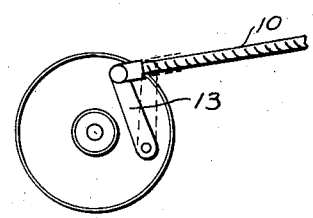
Figure 4:
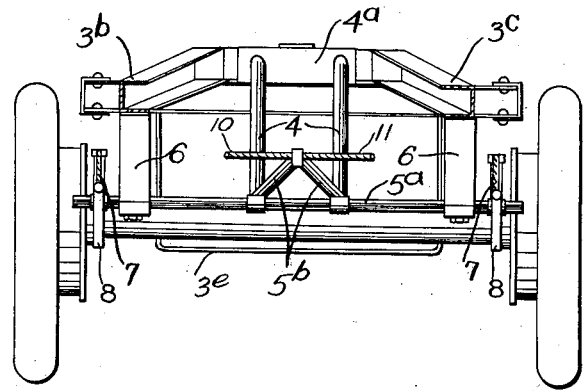
Figure 5:
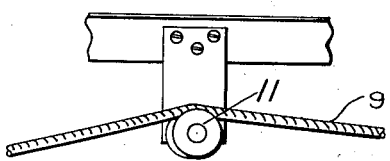

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of the drawing in which:

Figure 1 is a side elevational view of my apparatus shown positioned on a trailer and propulsion vehicle and showing by solid lines the apparatus in position when the brakes are not applied and in dash lines when in position when the brakes are applied and showing some of the portions broken away to facilitate the illustration; Fig. 2 is a sectional view taken from the line 2—2 of Fig. 1 and showing some of the parts broken away to facilitate the illustration; Fig. 3 is an enlarged fragmentary sectional view taken from the line 3—3 of Fig. 2; Fig. 4 is an enlarged sectional view taken from the line 4—4 of Fig. 2 and showing some of the portions in elevation to facilitate the illustration and Fig. 5 is an enlarged fragmentary side elevational view taken from the line 5—5 of Fig. 2.

Similar characters of reference refer to similar parts and portions throughout the several views of the drawing:

The propulsion vehicle 1, trailer vehicle 2, conventional trailer hitch 3, trailer brake operating lever 4, trailer brake operating lever arms 5, trailer brake operating supports 6, trailer brake operating lever links 7, trailer brake arms 8, trailer brake operating cables 9 and 10, trailer brake operating cable sheaves 11 and 12, and trailer brake arms 13 constitute the principal parts and portions of my automatic brake control apparatus for trailers.

The propulsion vehicle 1 may be any conventional type of propulsion vehicle, either an ordinary automobile or truck with a rear frame portion 1a which is adapted to receive a pin 3a mounted in the front end of the trailer hitch 3. This trailer hitch 3 is a double member consisting of members 3b and 3c positioned in spaced relation to each other as shown best in Figs. 2 and 4 of the drawing and extending across between these members is a plate 3d in which is mounted the kingpin 3a. These two members 3b and 3c extend backwardly and are connected to the rear ends of the springs 2a of the trailer 2 as shown best in Fig. 1 of the drawing, so that the main part of the hitch 3 is positioned considerably above the front axle of the trailer 2 as shown best in Fig. 1 of the drawing. Secured to the lower side of the hitch members 3b and 3c are the trailer brake operating supports 6 which extend downwardly in V-shape as shown best in Figs. 1 and 4 of the drawing and journaled in the lower portions of these members 6 is a shaft 5a which extends past said member 6 as shown best in Fig. 4 of the drawing and secured on the extended ends of these shafts 5a are the arm members 5, one at each end, and connected to the upper ends of these arms 5 are cables 7 and the opposite ends of these cables 7 connect with the upper ends of the trailer brake arms 8 which may be of any conventional type of arm for operating the brakes of conventional type shown best in Figs. 1 and 4 of the drawing.

Secured to the shaft 5a intermediate the supports 6 is the trailer brake operating lever 4 which consists of a U-shaped member secured in spaced relation at its opposite ends on the shaft 5a and it extends forwardly between the members 3b and 3c of the conventional hitch member 3. It is provided on its front end with a weight 4a shown best in Figs. 1 and 2 of the drawing, and this weight 4a is adapted to rest on the rear portion of the platform of the propulsion vehicle one just back of the kingpin 3a as shown best in Figs. 1 and 2 of the drawing, so that if the conventional hitch 3 becomes disconnected in any way from the propulsion vehicle 1, the weight 4a drops down carrying with it the lever 4 which turns the shaft 5a which turns the arm 5 and shifts the cables 7 and operates the brakes through the brake arm 8 as shown by dash lines in Fig. 1 of the drawing. In order to prevent the lever 4 from dropping down too far there is provided a stop bar 3e mounted on the conventional trailer hitch and extending downwardly a sufficient distance to permit the movement of the lever sufficiently to operate the brakes but prevents the lever from dropping clear to the ground. Secured in connection with the lower ends of the lever 4 and secured to the shaft 5a are two upwardly and backwardly extending arms 5b to which is connected the cables 9 and 10 at their forward ends as shown best in Figs. 1, 2, and 4 of the drawing. These cables 9 and 10 extend backwardly and outwardly and over sheaves 11 and 12 and then backwardly and connect with the arms 13 which are the rear trailer brake arms adapted to operate the brakes on the rear wheels of trailers having more than two wheels, it being noted that the cables 9 and 10, sheaves 11 and 12 and brakes connected with the brake arm 13 may be omitted from my apparatus where there is only a two wheel trailer used, it being noted that by the turning of the shaft 5a by the dropping of the lever 4, the brakes on all four wheels are applied simultaneously and upon raising the lever and supporting it upon the rear portion of the propulsion vehicle, as shown by solid line in Fig. 1 of the drawing, the brakes are released in conventional manner.

Though we have shown and described a particular construction, combination and arrangement of parts and portions, we do not wish to be limited to this particular construction, combination and arrangement, but desire to include in the scope of our invention, the construction, combination and arrangement substantially as set forth in the appended claims.

Having thus described our invention, what we claim as new and desire to secure by Letters Patent is:

1. In an automatic brake control apparatus for trailers of the class described, the combination with a conventional double member trailer hitch arranged to rest on the propulsion vehicle platform, of a pair of supports secured in spaced relation to each other on said conventional trailer hitch adjacent the front end of said trailer and extending downwardly therefrom, a shaft journalled in said supports and a weighted lever secured to said shaft and extending forwardly intermediate said double member of said conventional hitch and its front end resting freely on the body of said propulsion vehicle platform adjacent the rear end of said platform.

2. In an automatic brake control apparatus for trailers of the class described, the combination with a conventional double member trailer hitch arranged to rest on the propulsion vehicle platform, of a pair of supports secured in spaced relation to each other on said conventional trailer hitch adjacent the front end of said trailer and extending downwardly therefrom, a shaft journalled in said supports and a weighted lever secured to said shaft and extending forwardly intermediate said double member of said conventional hitch and its front end resting freely on the body of said propulsion vehicle platform adjacent the rear end of said platform, and arms secured to and extending upwardly on said shaft at its opposite ends and means connecting the extended ends of said arms with the trailer brake.

3. In an automatic brake control apparatus for trailers of the class described, the combination with a conventional double member trailer hitch arranged to rest on the propulsion vehicle platform, of a pair of supports secured in spaced relation to each other on said conventional trailer hitch adjacent the front end of said trailer and extending downwardly therefrom, a shaft journalled in said supports and a weighted lever secured to said shaft and extending forwardly intermediate said double member of said conventional hitch and its front end resting freely on the body of said propulsion vehicle platform adjacent the rear end of said platform, arms secured to and extending upwardly on said shaft at its opposite ends and means connecting the extended ends of said arms with the trailer brake, other arm members secured to said shaft intermediate its ends and extending upwardly and backwardly therefrom, and means connected therewith and connected with other brake arms on said trailer.

LEO GUNNAR NIELSEN.
FERREOL C. LYMBURNER.
FERREOL A. LYMBURNER.